United States Patent
Yu

(10) Patent No.: US 9,027,106 B2
(45) Date of Patent: May 5, 2015

(54) ORGANIZATIONAL ATTRIBUTION OF USER DEVICES

(71) Applicant: Bank of America Corporation, Charlotte, NC (US)

(72) Inventor: Sounil Yu, Reston, VA (US)

(73) Assignee: Bank of America Corporation, Charlotte, NC (US)

( * ) Notice: Subject to any disclaimer, the term of this patent is extended or adjusted under 35 U.S.C. 154(b) by 15 days.

(21) Appl. No.: 13/967,077

(22) Filed: Aug. 14, 2013

(65) Prior Publication Data

US 2015/0052579 A1 Feb. 19, 2015

(51) Int. Cl.
*H04L 29/06* (2006.01)
*G06F 21/31* (2013.01)

(52) U.S. Cl.
CPC ............ *H04L 63/10* (2013.01); *H04L 63/0876* (2013.01); *G06F 21/316* (2013.01)

(58) Field of Classification Search
CPC .... G06F 21/316; H04L 63/0876; H04L 63/10
USPC .......................................................... 726/7
See application file for complete search history.

(56) References Cited

U.S. PATENT DOCUMENTS

| 8,750,265 | B2* | 6/2014 | Scherzer et al. | 370/338 |
| 2004/0249983 | A1* | 12/2004 | Bedner | 709/249 |
| 2006/0072760 | A1* | 4/2006 | Gates | 380/270 |
| 2007/0294698 | A1* | 12/2007 | Thoelke et al. | 718/104 |
| 2009/0013052 | A1* | 1/2009 | Robarts et al. | 709/206 |
| 2010/0050240 | A1* | 2/2010 | Conway et al. | 726/4 |
| 2010/0211996 | A1 | 8/2010 | McGeehan et al. | |
| 2011/0013569 | A1* | 1/2011 | Scherzer et al. | 370/329 |
| 2013/0091537 | A1* | 4/2013 | Parla et al. | 726/1 |
| 2013/0117358 | A1* | 5/2013 | Ricard | 709/203 |
| 2014/0026220 | A1* | 1/2014 | Gehrig, Jr. | 726/23 |
| 2014/0059668 | A1* | 2/2014 | Holloway et al. | 726/12 |
| 2014/0164178 | A1* | 6/2014 | Adjaoute | 705/26.35 |

* cited by examiner

*Primary Examiner* — Michael Pyzocha
(74) *Attorney, Agent, or Firm* — Banner & Witcoff, Ltd.; Michael A. Springs

(57) ABSTRACT

A login request to access information associated with a website may be received from a user device accessing the website via a browser. A determination may be made as to whether a browser attribute of the browser, font type, or service set identifier (SSID) information is located within a database. A further determination may be made as to whether to grant access to the information associated with the website. The determination as to whether to grant access to the information associated with the website may be based at least in part on the browser attribute font type, or service set identifier (SSID) information.

20 Claims, 2 Drawing Sheets

ORGANIZATIONAL ATTRIBUTION OF USER DEVICES

BACKGROUND

Access to website information is often password protected. Meaning that in order for a user to access contents on the website, the user must enter a username and password to view the information. However, in certain instances, such as when the information is highly confidential or includes personal or financial information, website hosts may ask for additional credentials before the user is granted access to the information.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

In one example, when a user logs into a website, the host of the website can determine how and where the website is being accessed to determine the reputation of the particular user.

In another example, a system is provided that is configured to determine whether an individual poses a security risk by device finger printing. In one aspect, the system can be configured to screen the user's browser, service set identifier (SSID) information, or location information to determine the general reputation of the individual accessing the information. In particular, the system can be configured to associate certain attributes from the information with a particular type of user. For example, by reviewing the attributes of the user's available fonts, browser and/or device, the system can determine whether the user is a security risk or a legitimate user. The system can keep a database of potentially safe users by recognizing which users tend to be legitimate and by recognizing which users tend to be illegitimate. Where the system determines that the user may be a potential threat, the system can then either deny access or subject the user to a heightened level of scrutiny before granting access to the particular user.

Another example may include an apparatus having a processor and a memory for storing computer readable instructions that when executed by the processor cause the computer to perform one or more of the steps of: determining whether to grant a user access to information associated with a website; receiving by a processor a login request to access information associated with the website from a browser used to access the website by a user device; determining by a processor at least one available font type to the user through browser used to access the website; receiving by a processor SSID information from a device used by the user to access the website; identifying by a processor whether the at least one available font type and the SSID information are located within a database; and determining whether to grant access to the information based partially on the at least one available font type or the SSID information.

BRIEF DESCRIPTION OF THE DRAWINGS

A more complete understanding of the present disclosure and the advantages thereof may be acquired by referring to the following description in consideration of the accompanying drawings, in which like reference numbers indicate like features.

DETAILED DESCRIPTION

In the following description of the various embodiments, reference is made to the accompanying drawings, which form a part hereof, and in which is shown by way of examples various embodiments in which the disclosure may be practiced. It is to be understood that other embodiments may be utilized and structural and functional modifications may be made without departing from the scope of the present disclosure. The disclosure is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. For example, the use of "including" and "comprising" and variations thereof is meant to encompass the items listed thereafter and equivalents thereof as well as additional items and equivalents thereof, and the use of the terms "mounted," "connected," "coupled," "positioned," "engaged" and similar terms, is meant to include both direct and indirect mounting, connecting, coupling, positioning and engaging.

Figure 1:
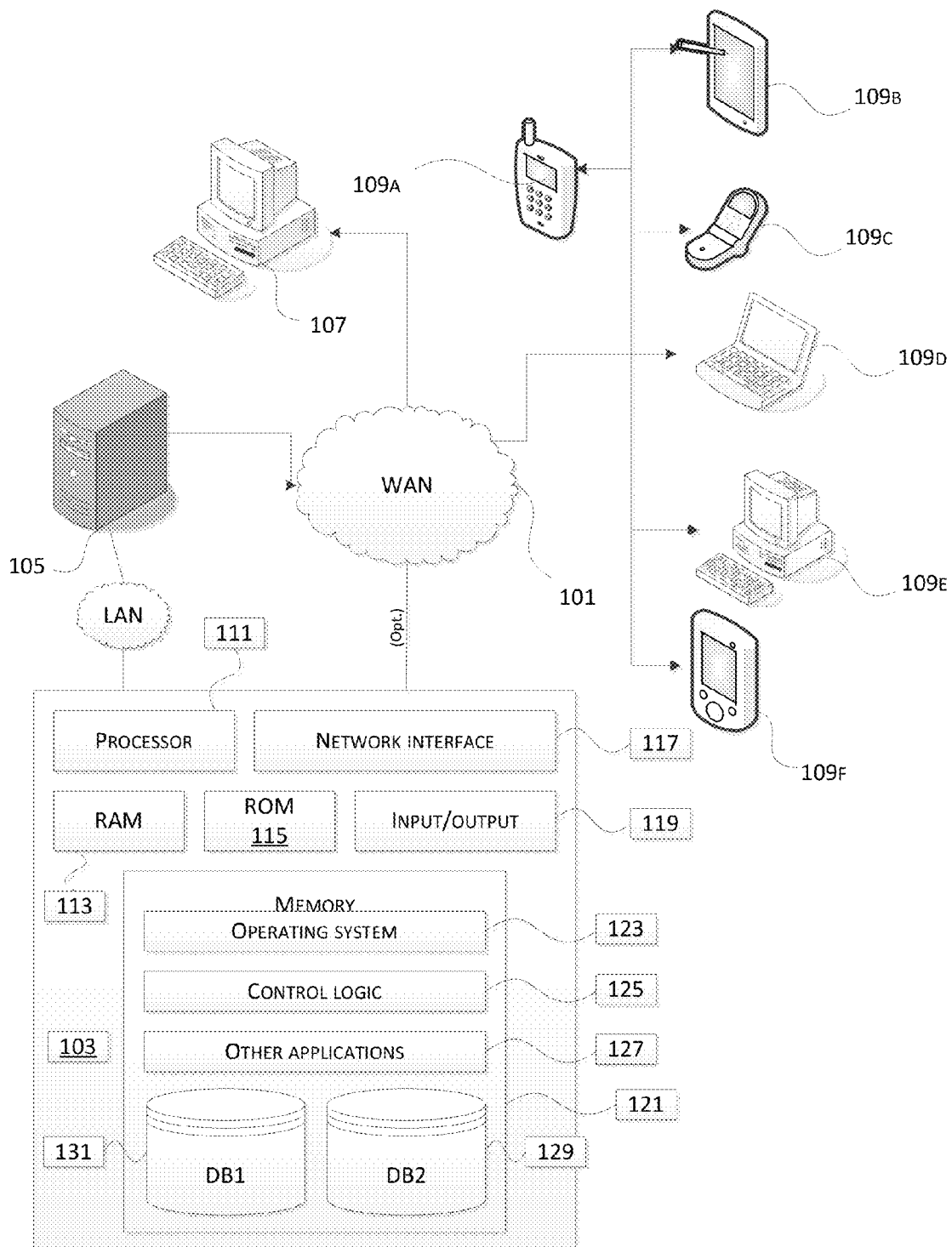
FIG. 1 illustrates one example of a network architecture and data processing device that may be used to implement one or more illustrative aspects of the disclosure.

FIG. 1 illustrates one example of a network architecture and data processing device that may be used to implement one or more illustrative aspects. Various network nodes 103, 105, 107, and 109$_{A-F}$ may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109$_{A-F}$ and other devices (not shown) may be connected to one or more of the networks via twisted pair wires, coaxial cable, fiber optics, radio waves or other communication media. For example, the above connections can be made via the internet, blue tooth, WiFi, infrared, or any other known method of wireless transmission.

As shown in FIG. 1, devices 109$_{A-F}$ may include personal computers such as desktops, laptops, notebooks, mobile telephones or smartphones with applications and other functionality, a handheld device with Wi-Fi or other wireless connectivity (e.g., wireless enabled tablets, tablet computers, PDAs, and the like), displays with built-in or external memories and processors, or any other known computer, computing device, or handheld computer can also be connected to one or more of the networks described herein. It is also contemplated that other types of devices such as ATMs, kiosks, and other cash handling devices can be connected to one or more of the networks described herein. These devices can be enabled to communicate with wireless access points which in one example can be a series of cellular towers hosted by a service provider. Additionally, the wireless access points may be Wi-Fi (e.g., compatible with IEEE 802.11a/b/g/ and the like wireless communication standards) connections and the computing devices may obtain access to the Internet at these connections. Other known techniques may be used to allow devices to connect with a network.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, and devices $109_{A-F}$. Data server 103 provides overall access, control and administration of databases and control software for performing one or more illustrative aspects as described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, devices $109_{A-F}$, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 or devices $109_{A-F}$ a user may access web server 105 using an Internet browser, as is known in the art, or by executing a software application or app that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device as discussed herein. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, or the like), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects as described herein, and other application software 127 providing secondary, support, and/or other functionality which may or may not be used in conjunction with one or more aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, or the like).

Memory 121 may also store data used in performance of one or more aspects, including a first database 129 and a second database 131. In some embodiments, the first database may include the second database (e.g., as a separate table, report, or the like). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, $109_{A-F}$) as described herein may be spread across multiple data processing devices, for example, to distribute processing load across multiple computers, to segregate transactions based on geographic location, user access level, quality of service (QoS), or the like.

One or more aspects may be embodied in computer-usable or readable data and/or computer-executable instructions, such as in one or more program modules, executed by one or more computers or other devices as described herein. Generally, program modules include routines, programs, objects, components, data structures, or the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, or the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Figure 2:
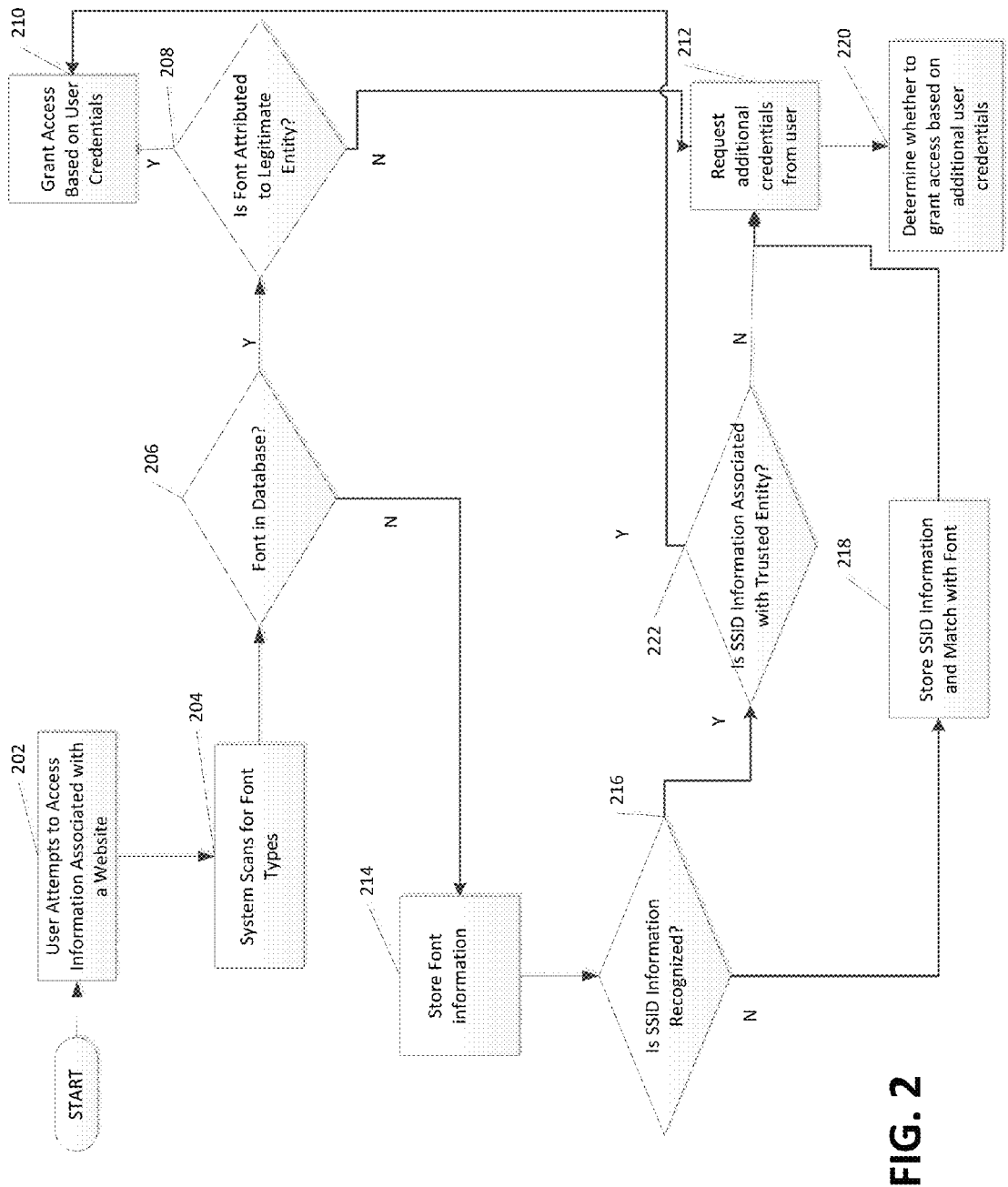
FIG. 2 illustrates an exemplary process in accordance with one aspect of the disclosure.

An exemplary process is shown in relation to FIG. 2 where the user attempts to access protected content associated with a website. The website may request a username and password for accessing the information. The login request to access information associated with the website may be received from a user device accessing the website via a browser. As shown in FIG. 2, when the user attempts to logon to the website at step 202, the system can be configured to scan for one or more of the user's available fonts through the user's browser at step 204. The available fonts can be associated with a particular organization or group of users. In alternative example, the system can be configured to scan for one or more of the user's browser attributes at step 204.

The system can then determine whether a particular font is in the system database at step 206. If the font is located in the system database at step 208, the system can determine whether the font is attributed to a legitimate entity or organization. At step 208, if the font is attributed to a legitimate entity, the system can grant the user access to the protected content at step 210. For example, the system is able to identify a corporate user or someone accessing the information on behalf of a particular entity and can then allow the individual to access the information. However, if the font is not attributed to a legitimate entity, the system can be configured to request additional credentials from the user at step 212 or decide to deny the user access to the information. The system can decide to grant the user access to the information based on the additional credentials at step 200. If the font is not located in the system's database, the system can save the font information at step 214.

Many organizations will use organization-specific fonts, or fonts that are particular to a specific organization (e.g., proprietary fonts). When a user accesses a website, the system can identify these particular fonts and attempt to associate these fonts with a particular entity. In this way, the system can determine whether the user is a legitimate user or a potential security risk. For example, if an individual is attempting to access the website and a font is identified attributed to a large corporation, it is likely that the user is not a security threat, and the system may grant access to the user after receiving the user's login information and password. However, if the individual is attempting to access the system from an untrusted entity or location, the system can place the user through more rigorous scrutiny to determine whether the user is legitimate at step 212. In order to track particular entities, the system can keep a database of fonts and can associate the fonts with particular entities that have legitimate or illegitimate users by grouping the particular fonts. In other words, the system can keep an updated listing of fonts that are associated with legitimate users and an updated listing of fonts that are associated with illegitimate users.

The system can also scan the user's device for network or SSID information and determine whether the SSID information is recognized at step 216. For example, the user's device may have multiple SSIDs stored in memory and the system can be configured to receive this information. Portable devices continuously search for pre-saved SSIDs or hotspots and attempt to connect to the internet through these SSIDs. The user's device may have various networks or hotspots saved in the device for accessing the internet. The particular SSID used to access the internet may vary based on the user's particular location. This information can be used to determine how to handle a login request from a particular user. For example, as shown in step 222 if the SSID is associated with a trusted entity, the system can grant the user access to the website at step 210. However, if the SSID information is not associated with a trusted entity, then the system can subject the user to additional scrutiny at step 212.

It is also contemplated that once a user attempts to login to the website to request information, the system can obtain SSID information from the user's device at any time. With the SSID information, the system can associate the user with a particular entity based on the SSID information from the device. For example, the system can pinpoint the location of the particular SSID to determine the association of the particular user. Based on this association, it can then be determined whether the user is legitimate or illegitimate. In order to obtain the SSID information from the user devices, the system may have to receive permission from the particular user, which can come in the form of a software license agreement. In one example, when the user requests information from the website, the system can implement instructions on the user's device to obtain SSID and hotspot information. In certain instances, for example, the system can store the SSID or hotspot information to collect SSID information for future logon requests.

In one example, the system can correlate users' browser font type with the devices' SSID information to identify a group of users and determine the general trustworthiness of the particular group of users. The system can at step 218 store the SSID information and match up the SSID information with an identified font for future use in evaluating users that appear on the website requesting access to information. For example, the system can determine based on the SSID information, a location or grouping of the users and associate the users with a particular type of font. The system may determine that a particular group of users is legitimate if the group members access a website from a particular SSID and/or if a font that is associated with a group of legitimate users is identified. Once the system collects and associates the SSIDs with a particular group of users and fonts, the system will be able to make additional determinations on whether a particular user is legitimate or not and how to handle the particular user's login requests. For example, if the websites are accessed through a remote location that is associated with certain security risks, the system may deny access or request additional screening information to determine whether the user is legitimate. In another example, the system may determine that the user is a part of a particular trusted entity, such as a corporation, university, or government agency and will not subject the particular user to rigorous scrutiny.

It is also contemplated that the system may also determine whether to grant access to the information based at least partially on font types, browser attributes, or based at least partially on the SSID information. The information collected from the user devices can be used to create a list of trusted organizations based on the font types, SSID information, and/or browser attributes.

An exemplary example can include an apparatus having at least one processor; and a memory storing instructions that, when executed by the at least one processor, cause the apparatus to perform a method, which includes receiving, from a user device accessing a website via a browser, a login request to access information associated with the website; obtaining at least one available font-type from the user device; determining whether the at least one available font-type is located within a database; and determining, based at least in part on the at least one available font type, whether to grant access to the information associated with the website.

The at least one available font type can be associated with an organization. The one available font type can be obtained through the user's browser. The apparatus can be configured to store the at least one available font type and subsequently access the at least one available font type for evaluating future login attempts. The apparatus can be configured to receive service set identifier (SSID) information from the user device, store the SSID information, associate the SSID information with an organization, and determine whether to grant access to the information associated with the website based at least in part on the SSID information. The apparatus can be configured to associate the at least one available font type and the SSID information to partially determine whether to grant access to the information associated with the website. The apparatus can be configured to create a list of trusted organizations based on the SSID information. The apparatus can be configured to maintain a list of trusted organizations based on the at least one available font type.

In another example, a computer-implemented method of determining whether to grant a user access to information associated with a website may include receiving, by a processor and from a user device accessing a website via a browser, a login request to access information associated with the website; requesting, from the user device accessing the website via the browser, at least one available font type and service set identifier (SSID) information stored on the user device; identifying, within a database, one or more records comprising at least one of the at least one available font type or the SSID information; and determining, based on the one or more records, whether to grant access to the information associated with the website. The at least one available font type can be associated with an organization. The method can further include identifying additional font types via the browser. The method may also include storing the at least one available font type and subsequently accessing the at least one available font type for evaluating future login attempts. The method may also include storing the SSID information, associating the SSID information with an organization, and determining whether to grant access to the information associated with the website based partially on the SSID information. The method may also include associating the at least one available font type and the SSID information to partially determine whether to grant access to the information associated with the website and creating a list of trusted organizations based on the SSID information. The method may also include maintaining a list of trusted organizations based on the at least one available font type.

In another example, one or more non-transitory computer-readable media having instructions stored thereon that, when executed, can cause at least one computing device to: receive, from a user device accessing a website via a browser, a login request to access information associated with the website; receive at least one of an available font type or service set identifier (SSID) information associated with the user device; and determine, based at least in part on the at least one of the available font type or the SSID information, whether to request additional information from the user device prior to granting access to the information associated with the website. The available font type can be associated with an organization. The available font type can be obtained via the browser. The at least one computing device can be configured to store the available font type and subsequently utilize the available font type to evaluate a different login attempt.

In one exemplary aspect an apparatus comprising a processor; and a memory for storing computer readable instructions that, when executed by said processor, can cause the computer to perform the steps of: receiving a login request to access information associated with a website from a browser used to access the website by a user device; scanning the browser used to access the website for at least one browser attribute; identifying whether the at least one browser attribute is located within a database; and determining whether to grant access to the information based partially on the at least one browser attribute. The at least one browser attribute can be associated with an organization. The at least one browser attribute can be the font type of the browser. The at least one browser attribute can be stored and accessed for evaluating future login attempts. The processor can also receive SSID information from the user device, store the SSID information, and associate the SSID information with an organization and determine whether to grant access to the information based partially on the SSID information. The processor can also associate the at least one browser attribute and the SSID information to partially determine whether to grant access to the information. A list of trusted organizations based on the SSID information can also be created and a list of trusted organizations based on the at least one browser attribute can also be maintained.

In another example, a computer-implemented method of determining whether to grant a user access to information associated with a website is disclosed. The method may include receiving by a processor a login request to access information associated with a website from a browser used to access the website by a user device; scanning by a processor the browser used to access the website for at least one browser attribute; receiving by a processor SSID information from a device used by the user to access the website; identifying by a processor whether the at least one browser attribute and the SSID information are located within a database; and determining by a processor whether to grant access to the information based partially on the at least one browser attribute or the SSID information. The at least one browser attribute can be associated with an organization, and the at least one browser attribute can be a font type of the browser. The method can further include storing the at least one browser attribute and storing the SSID information, and associating the SSID information with an organization and determining whether to grant access to the information based partially on the SSID information. The method can further include associating the at least one browser attribute and the SSID information to partially determine whether to grant access to the information, creating a list of trusted organizations based on the SSID information, and maintaining a list of trusted organizations based on the at least one browser attribute.

In another aspect, one or more non-transitory computer-readable media having instructions stored thereon that, when executed, cause at least one computing device to perform one or more aspects of the methods discussed herein.

Examples are disclosed above and in the accompanying drawings with reference to a variety of embodiments. The purpose served by the disclosure, however, is to provide examples of the various features and concepts, not to limit the scope of the appended claims. One skilled in the relevant art will recognize that numerous variations and modifications may be made to the embodiments described above without departing from the scope of the disclosure, as defined by the appended claims.

What is claimed is:

1. An apparatus comprising:
at least one processor; and
a memory storing instructions that, when executed by the at least one processor, cause the apparatus to:
receive, from a user device accessing a website via a browser, a login request to access information associated with the website;
obtain at least one available font type from the user device;
determine whether the at least one available font type is located within a database;
determine whether the available font type is attributable to a legitimate entity, wherein if the available font type is attributable to a legitimate entity, determine based at least in part on the at least one available font type, whether to grant access to the information associated with the website; and
wherein if the available font type is not attributable to a legitimate entity, request additional credentials from the user device and determine whether to grant access to the information based on the additional credentials from the user device.

2. The apparatus of claim 1 wherein the at least one available font type is associated with an organization.

3. The apparatus of claim 2 wherein the at least one available font type is obtained through the user device's browser.

4. The apparatus of claim 1 wherein the instructions, when executed by the at least one processor, cause the apparatus to store the at least one available font type and subsequently access the at least one available font type for evaluating future login attempts.

5. The apparatus of claim 4 wherein the instructions, when executed by the at least one processor, cause the apparatus to receive service set identifier (SSID) information from the user device, store the SSID information, associate the SSID information with an organization, and determine whether to grant access to the information associated with the website based at least in part on the SSID information.

6. The apparatus of claim 5 wherein the instructions, when executed by the at least one processor, cause the apparatus to associate the at least one available font type and the SSID information to partially determine whether to grant access to the information associated with the website.

7. The apparatus of claim 5 wherein the instructions, when executed by the at least one processor, cause the apparatus to create a list of trusted organizations based on the SSID information.

8. The apparatus of claim 1 wherein the instructions, when executed by the at least one processor, cause the apparatus to maintain a list of trusted organizations based on the at least one available font type.

9. A computer-implemented method of determining whether to grant a user access to information associated with a website, the computer-implemented method comprising:
receiving, by a processor and from a user device accessing a website via a browser, a login request to access information associated with the website;
requesting, from the user device accessing the website via the browser, at least one available font type;
identifying, within a database, one or more records comprising at least one of the at least one available font type; and
determine whether the available font type is attributable to a legitimate entity, wherein if the available font type is attributable to a legitimate entity, determine based at least in part on the at least one available font type, whether to grant access to the information associated with the website;
wherein if the available font type is not in the database requesting, from the user device accessing the website via the browser, a service set identifier (SSID) information stored on the user device;
determining, based partially on either the available font type or the SSID information, whether to grant access to the information associated with the website;
wherein if the available font type or the SSID information is not attributable to a legitimate entity, request additional credentials from the user device and determine whether to grant access to the information based on the additional credentials from the user device.

10. The computer-implemented method of claim 9 wherein the at least one available font type is associated with an organization.

11. The computer-implemented method of claim 9 further comprising identifying additional font types via the browser.

12. The computer-implemented method of claim 9 further comprising storing the at least one available font type and subsequently accessing the at least one available font type for evaluating future login attempts.

13. The computer-implemented of claim 12 further comprising storing the SSID information, associating the SSID information with an organization, and determining whether to grant access to the information associated with the website based partially on the SSID information.

14. The computer-implemented method of claim 9 further comprising associating the at least one available font type and the SSID information to partially determine whether to grant access to the information associated with the website.

15. The computer-implemented method of claim 9 further comprising creating a list of trusted organizations based on the SSID information.

16. The computer-implemented method of claim 9 further comprising maintaining a list of trusted organizations based on the at least one available font type.

17. One or more non-transitory computer-readable media having instructions stored thereon that, when executed, cause at least one computing device to:
receive, from a user device accessing a website via a browser, a login request to access information associated with the website;
receive an available font type and service set identifier (SSID) information associated with the user device;
determine whether the available font type and the SSID is attributable to a legitimate entity, wherein if the available font type of the SSID is attributable to a legitimate entity, determine based at least in part on the available font type or the SSID, whether to grant access to the information associated with the website; and
determine, based at least in part on the available font type and the SSID information, whether to request additional information from the user device prior to granting access to the information associated with the website.

18. The one or more non-transitory computer-readable media of claim 17 wherein the available font type is associated with an organization.

19. The one or more non-transitory computer-readable media of claim 17 wherein the available font type is obtained via the browser.

20. The one or more non-transitory computer-readable media of claim 17 wherein the instructions, when executed, cause the at least one computing device to store the available font type and subsequently utilize the available font type to evaluate a different login attempt.

* * * * *